April 14, 1959                A. ANDERSON ET AL                2,882,458
                                MULTIPOLE CHUCK
Filed Nov. 13, 1953                                       5 Sheets-Sheet 1

Inventor
Axel Anderson
Eric Anderson
By Schroeder, Merriam,
Hofgren & Brady, Atty's April 14, 1959  A. ANDERSON ET AL  2,882,458
MULTIPOLE CHUCK Filed Nov. 13, 1953  5 Sheets-Sheet 2

Inventors
Axel Anderson
Eric Anderson
By Schroeder, Merriam, Hofgren + Brady
Atty's

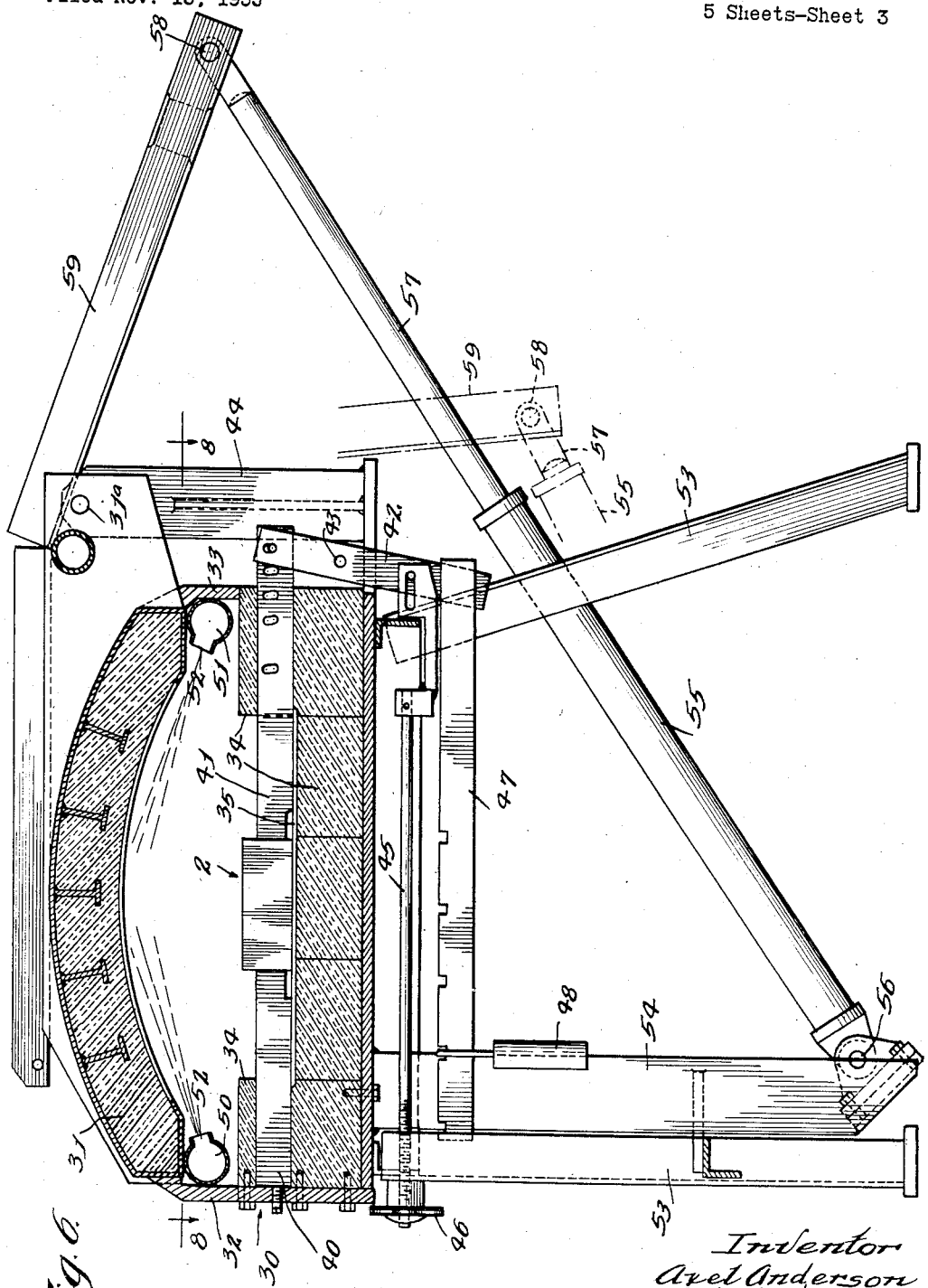

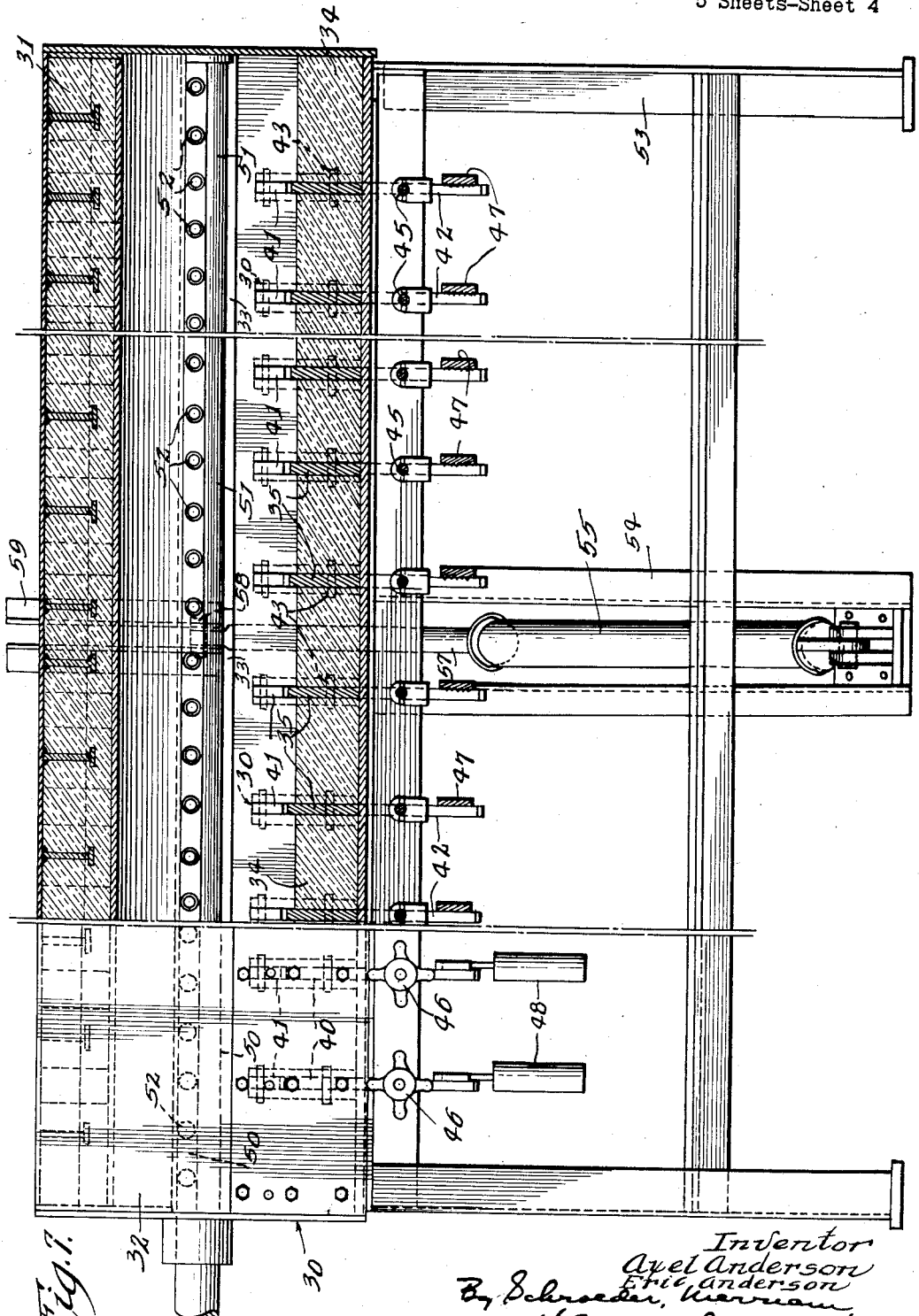

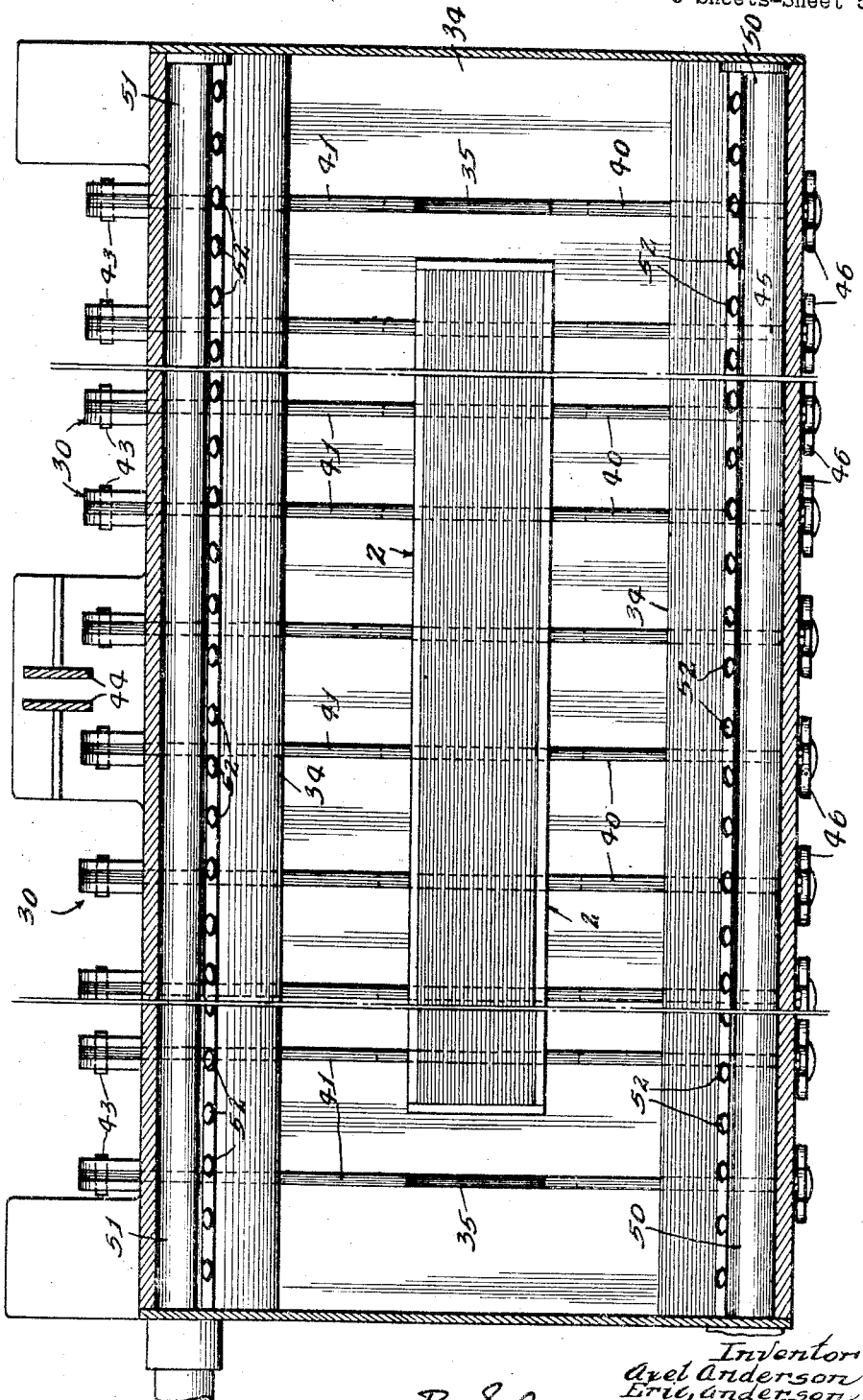

United States Patent Office 2,882,458
Patented Apr. 14, 1959

2,882,458

MULTIPOLE CHUCK

Axel Anderson and Eric Anderson, Rockford, Ill., assignors, by mesne assignments, to Sundstrand Machine Tool Co., Rockford, Ill., a corporation of Illinois Application November 13, 1953, Serial No. 391,964

1 Claim. (Cl. 317—163)

This invention relates to a multipole magnetic chuck and more particularly to a multipole magnetic chuck having a relatively large number of pole pieces on the face thereof and the method of making such a chuck.

The general object of this invention is to provide a new and improved magnetic chuck.

Another object of this invention is to provide a magnetic chuck having a face assembly formed of major pole pieces extending to the work-engaging face of the chuck and for the entire depth of the face assembly and minor pole pieces extending for only a portion of the depth of the face assembly.

Another object of the invention is to provide a magnetic chuck of the type described in the preceding paragraph wherein the major pole pieces have a reduced cross-sectional area for a portion of their widths positioned at the top of the face assembly and have the plurality of minor pole pieces disposed therebetween and extending for only a portion of the depth of the face assembly and wherein the pole pieces have non-magnetic inserts disposed therebetween and bonded thereto for providing high reluctance gaps between the pole pieces.

Another object of the invention is to provide a method of assembling a magnetic chuck.

Another object of the invention is to provide a method of assembling a magnetic chuck having alternate strips of magnetic and non-magnetic material which are assembled with strips of silver solder, in solid state, by heating the assembly, while under pressure, to liquify the solder and subsequently cooling the assembly to provide a magnetic chuck having a face assembly which is a unitary structure and does not require any bolts or clamping structure while in use.

The objects of the invention thus generally set forth together with other and ancillary advantages are attained by the method described herein and by the construction and arrangement shown by way of illustration in the accompanying drawings, in which:

Fig. 6 is a side elevation of the brazing fixture, with parts thereof in section, for brazing the face assembly of the magnetic chuck;

Fig. 7 is a fragmentary front elevation of the brazing fixture with parts thereof in section; and Fig. 8 is a fragmentary plan view of the brazing fixture with the cover removed.

Figure 1:
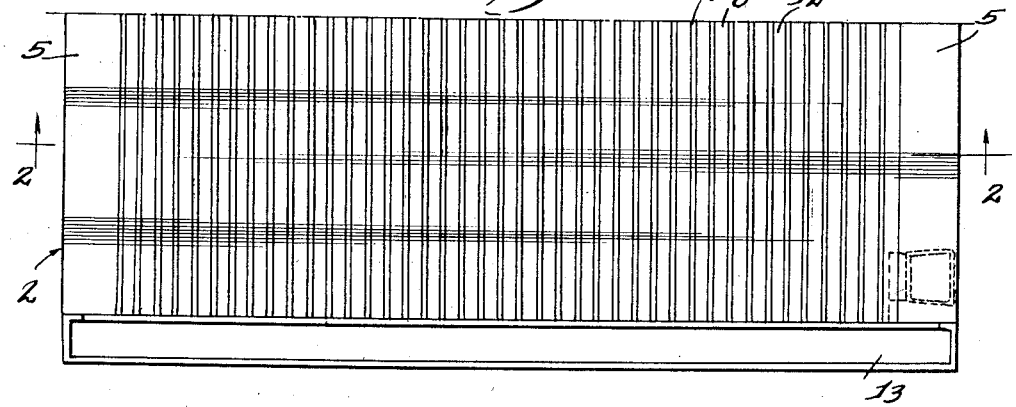
Fig. 1 is a fragmentary plan view of one end of the magnetic chuck.
Figure 2:
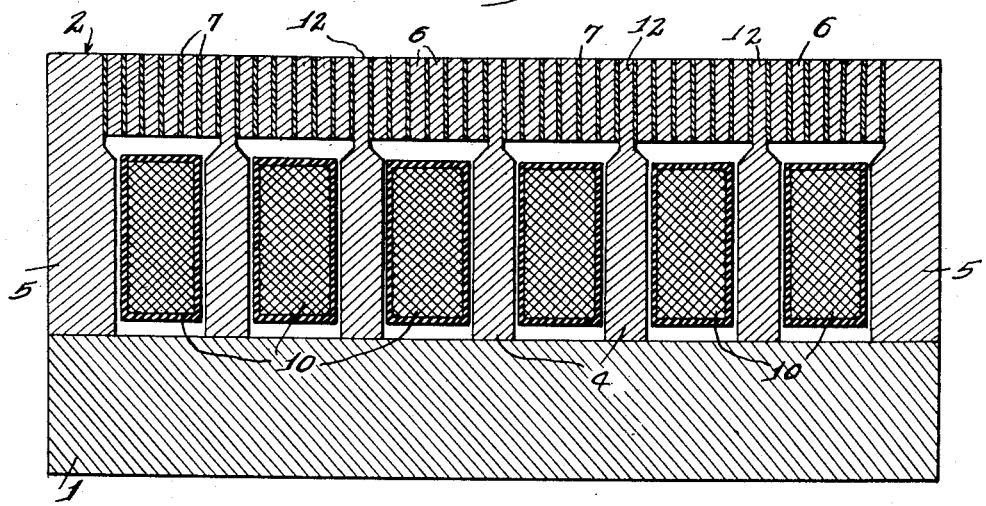
Fig. 2 is a vertical section taken substantially along the line 2—2 in Fig. 1.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

As illustrated in Figs. 1 to 5, the magnetic chuck comprises a generally rectangular base plate 1 which is secured to a face assembly, indicated generally at 2, by bolts 3. The base plate 1 may be attached to the table or other support of a machine which is to perform operations on the work piece.

The face assembly 2 comprises a plurality of elongated major pole pieces 4 and 5 of magnetic material between which a plurality of elongated minor pole pieces 6 of magnetic material are positioned. The major pole pieces 5 constitute end pole pieces for the chuck. The minor pole pieces 6 are spaced from the major pole pieces 4 and end pole pieces 5 by non-magnetic spacers 7 made of a non-magnetic material, such as brass, which provide high reluctance gaps for the magnetic circuits extending between pole pieces.

The major pole pieces 4 and 5 are of a height sufficient to extend from the base plate to the face of the chuck and for the entire depth of the face assembly and disposed between these pole pieces are a plurality of magnetic coils 10 which may be energized by a power line, not shown, which connects to a terminal assembly 11.

The major pole pieces 4 and 5 have a portion 12 of their width which is of a cross-sectional area substantially less than that of the portion of the pole pieces which are disposed between the magnetic coils 10. This reduction in area provides stronger magnetic circuits between the pole pieces because of the increased flux density in the portions 12 of the pole pieces 4 and 5.

End plates 13 of magnetic material are secured to the ends of the chuck by attaching means, such as screws 14, and bolts 15 extend through the base plate 1 to secure the major pole pieces 4 to the base plate 1.

With this construction, the face of the chuck has magnetic circuits covering substantially its entire area and so long as a work piece is positioned over at least two of the minor pole pieces 6, a magnetic circuit will pass through the work piece to securely hold the work piece on the chuck.

Figure 3:
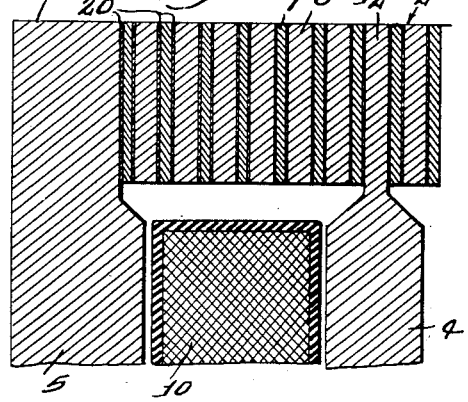
Fig. 3 is an enlarged view of one edge portion of the chuck as shown in Fig. 2.
Figure 4:
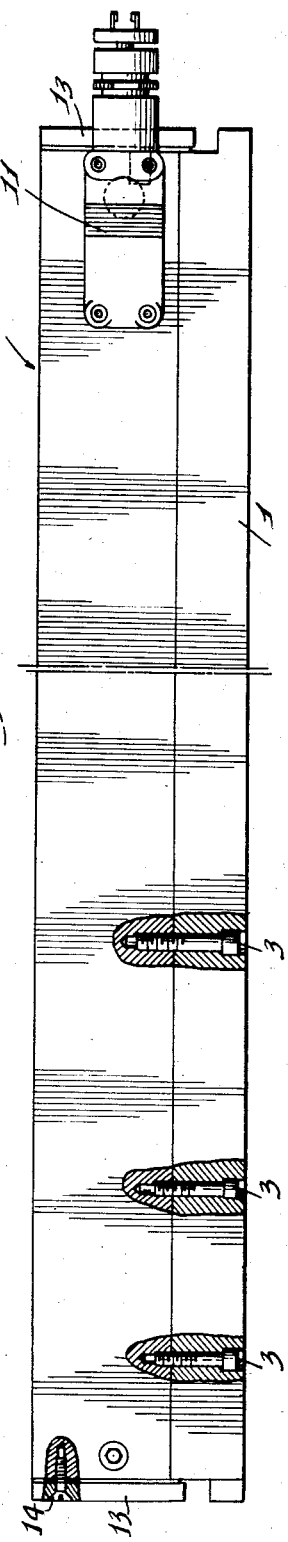
Fig. 4 is a fragmentary side view of the magnetic chuck.
Figure 5:
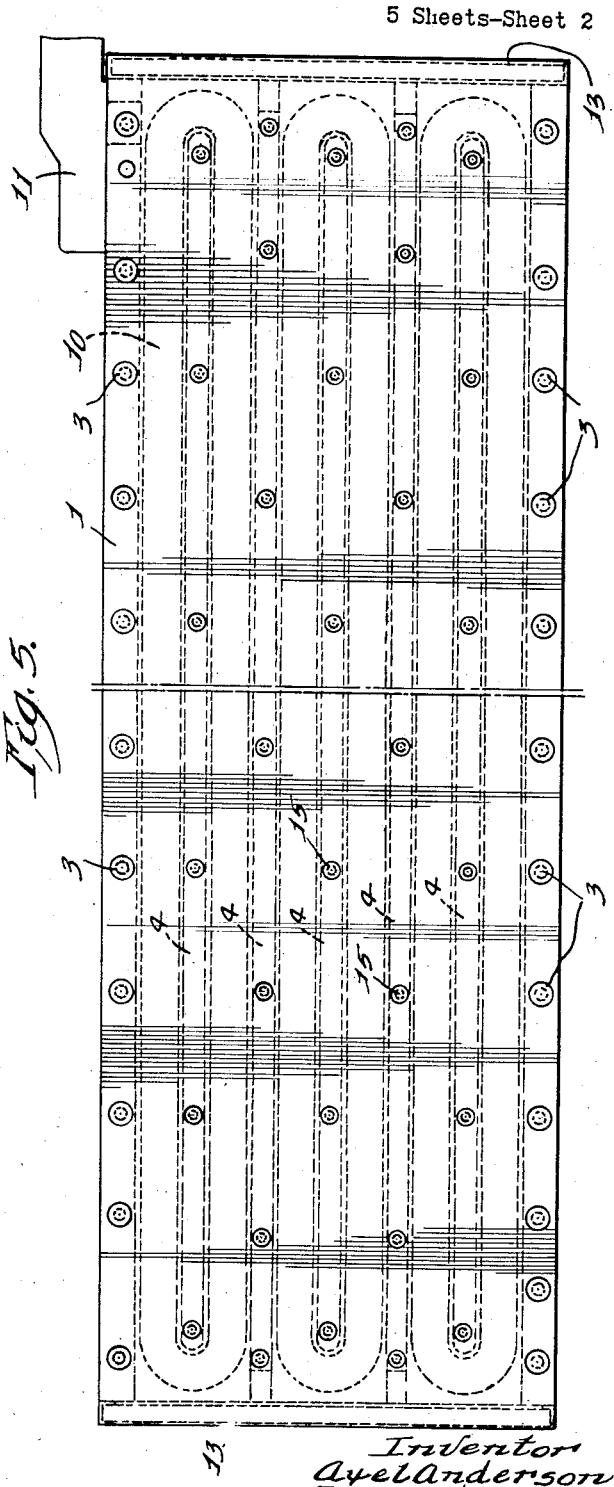
Fig. 5 is a fragmentary bottom plan view of the magnetic chuck.

The chuck is constructed to provide a unitary structure avoiding the use of bolts or clamping devices to hold the parts together and this is accomplished by the use of silver solder for bonding the major pole pieces 4 and 5, the minor pole pieces 6, and the non-magnetic inserts 7 together. In the enlarged view as shown in Fig. 3, a fine layer 20 of solder is disposed between the non-magnetic inserts 7 and the pole pieces 4, 5 and 6.

A brazing fixture, indicated generally at 30, as illustrated in Figs. 6, 7 and 8, is used to make the face assembly 2. This fixture has a heating chamber formed by the cover 31 pivoted at 31a, side walls 32 and 33 and a lining of fire brick 34 extending along the sides and across the bottom of the chamber. Transversely spaced plates 35 extend across the floor of the heating chamber to space the face assembly 2 away from the fire brick 34.

A row of stationary clamping members 40 extend along the front of the brazing fixture 30 and through the fire brick and form abutments against which one side of the chuck face assembly may be aligned. A row of adjustable clamping members 41 extend along the rear of the brazing fixture 30 and through the fire brick 34 and form another row of abutments which engage the other side of the face assembly 2.

Each of the adjustable clamping members 41 has associated therewith a lever 42 pivoted at 43 to the frame work 44 of the fixture. The levers 42 are connected to a series of rods 45 each of which have a threaded end at the front of the fixture upon which are secured handles 46 which, when turned, will cause shifting of the rods 45 to adjust the position of the adjustable clamping members 41.

A bar 47 is associated with each of the pivotally mounted levers 42 and has mounted thereon a weight 48 to insure that the adjustable clamping members 41 will be projected into the heating chamber as far as is permitted by the position of the adjusting handles 46. The weight 48 acts to maintain the adjusting handle 46 in position against the framework of the fixture.

In order to provide sufficient heat in the heating chamber, a front pipe 50 and a rear pipe 51 extending along the length of the fixture are provided with openings 52 for directing a series of jets of burning gas into the chamber.

The fixture 30 is provided with legs 53 which support the fixture in elevated position. A frame member 54 extends beneath the fixture 30 and has a fluid cylinder 55 pivotally connected thereto by a pin 56. The piston rod 57 is pivotally connected by a pin 58 to an arm 59 which is rigidly attached to the cover 31. When fluid pressure is exerted at the upper end of the cylinder 55, the piston rod will be drawn within the cylinder and cause movement of the cylinder and arm 59 to the dotted line position in Fig. 6, in which position the cover 31 is elevated.

The face assembly is built up within the fixture in the following manner: an end pole piece 5 is placed against the clamping members 40; a strip of silver solder which may be approximately .003 inch in thickness and which extends the length of the base assembly is placed against the end pole piece 5; a strip of brass forming the non-magnetic insert 7 which may be approximately .050 inch in thickness is placed against the solder strip; another strip of silver solder is placed against the non-magnetic insert 7 and then a minor pole piece 6 is placed against the solder. This order is followed until a major pole piece 4 is used instead of a minor pole piece 6 and then after the entire width of the face assembly is formed in the fixture, the other end pole piece 5 is placed in position. The work-engaging face of the face assembly will be adjacent the bottom of the heating chamber.

The adjustable clamping members 41 are then brought into position by movement of the handles 46 to firmly secure the face assembly between the stationary clamping members 40 and the adjustable clamping members 41. The cover 31 is then lowered by operation of the cylinder 55 to enclose the heating chamber and the chamber is then heated.

The chamber during a heating operation reaches a temperature slightly above 1350° F. which is the melting point of the silver solder. As this heating occurs and the solder becomes fluid, the area occupied by the solder is reduced. This is at least partly due to "running" of the solder. Because of this, it is necessary for the operator to continuously move the rear clamping members 41 toward the front of the fixture by adjustment of the handles 46 to exert a continuous clamping pressure to insure that the components of the face assembly are held tightly against each other.

After the desired temperature is reached and the solder has melted, the heating chamber is permitted to cool to cause solidification of the solder with resultant bonding of the components of the face assembly. After the face assembly has cooled, the cover 31 is raised by the cylinder 55 to permit removal of the face assembly and the magnetic chuck is then completed by placing the magnetic coils 10 therein and attaching thereto the base plate and other parts described above.

We claim:

A magnetic chuck having a generally rectangular base plate adapted to be secured to a support, and a face assembly coextensive with and secured to said base plate, said face assembly comprising, a plurality of elongated major pole pieces of magnetic material laterally spaced across the width of the chuck and of sufficient height to extend from the base plate to the work engaging face of the chuck, said major pole pieces having their upper portions adjacent the work-engaging face of the chuck of a reduced cross-sectional area to increase the flux density; a plurality of elongated minor pole pieces of magnetic material positioned between said upper portions of the major pole pieces, inserts of non-magnetic material providing high reluctance gaps disposed between minor pole pieces and the upper portions of the major pole pieces, said pole pieces and inserts having their upper surfaces in flush alignment to form a smooth work engaging chuck face, said minor pole pieces and inserts of non-magnetic material being of reduced height to define with the lower portions of said major pole pieces coil receiving cavities between the work engaging face and the base plate, thin layers of bonding material disposed respectively between the adjacent inserts and pole pieces, said layers being coextensive with the opposed insert and the pole piece surfaces and bonded to both the inserts and the pole pieces and forming the sole means of securing the inserts and pole pieces together, and a plurality of magnetic coils passing around said major pole pieces between said base plate and work engaging face to provide a plurality of magnetic circuits on the face of the chuck for magnetically holding magnetic material disposed thereon.

References Cited in the file of this patent

UNITED STATES PATENTS

| | | |
|---|---|---|
| 1,232,512 | Downes et al. | July 10, 1917 |
| 1,582,683 | Harmon | Apr. 27, 1926 |
| 2,401,887 | Sheppard | June 11, 1946 |
| 2,435,737 | Carson | Feb. 10, 1948 |
| 2,479,325 | De Domenico | Aug. 16, 1949 |
| 2,536,795 | Carson | Jan. 2, 1951 |
| 2,654,142 | Horelick | Oct. 6, 1953 |

FOREIGN PATENTS

| | | |
|---|---|---|
| 595,048 | France | Sept. 25, 1925 |